United States Patent
Ikeda et al.

(10) Patent No.: US 10,831,027 B2
(45) Date of Patent: Nov. 10, 2020

(54) DISPLAY DEVICE, IMAGE PROCESSING DEVICE AND IMAGE PROCESSING METHOD

(71) Applicant: SONY CORPORATION, Tokyo (JP)

(72) Inventors: Kiyoshi Ikeda, Kanagawa (JP); Ken Tamayama, Tokyo (JP); Masayuki Shimizu, Kanagawa (JP)

(73) Assignee: SONY CORPORATION, Kanagawa (JP)

( * ) Notice: Subject to any disclaimer, the term of this patent is extended or adjusted under 35 U.S.C. 154(b) by 2 days.

(21) Appl. No.: 15/653,938

(22) Filed: Jul. 19, 2017

(65) Prior Publication Data

US 2017/0315363 A1    Nov. 2, 2017

Related U.S. Application Data

(63) Continuation of application No. 14/117,692, filed as application No. PCT/JP2012/083736 on Dec. 26, 2012, now Pat. No. 9,740,007.

(30) Foreign Application Priority Data

Mar. 22, 2012    (JP) .................................. 2012-064899

(51) Int. Cl.
  *G02B 27/01*    (2006.01)
  *H04N 13/327*    (2018.01)
  (Continued)

(52) U.S. Cl.
  CPC ........... *G02B 27/0172* (2013.01); *G02B 7/12* (2013.01); *G02B 27/0025* (2013.01);
  (Continued)

(58) Field of Classification Search
  None
  See application file for complete search history.

(56) References Cited

U.S. PATENT DOCUMENTS 5,369,450 A    11/1994    Haseltine et al.
2006/0072206 A1*    4/2006    Tsuyuki ............. G02B 27/0172
                                                            359/631

(Continued)

FOREIGN PATENT DOCUMENTS

CN    101726854 A    6/2010
JP    06-276459 A    9/1994
(Continued)

OTHER PUBLICATIONS

Office Action received for Chinese Patent Application No. 201280023550.4. dated May 18, 2016,22 Pages of Office Action Including 13 Pages of Engltsh translation.
(Continued)

*Primary Examiner* — Amare Mengistu
*Assistant Examiner* — Sarvesh J Nadkarni
(74) *Attorney, Agent, or Firm* — Chip Law Group

(57) ABSTRACT

There is provided a display device including a display unit that displays an image thereon, an optical unit that projects a display image of the display unit on the eyes of a user, a correction information retaining unit that retains correction information created in advance according to a state of the user, and a distortion correction unit that corrects distortion of the display image based on correction information according to a current state of the user.

11 Claims, 13 Drawing Sheets

(51) Int. Cl.
*H04N 13/344* (2018.01)
*G09G 3/00* (2006.01)
*G02B 27/00* (2006.01)
*G02B 7/12* (2006.01)

(52) U.S. Cl.
CPC ....... *G02B 27/0093* (2013.01); *G02B 27/017* (2013.01); *G09G 3/002* (2013.01); *H04N 13/327* (2018.05); *H04N 13/344* (2018.05); *G02B 2027/011* (2013.01); *G02B 2027/014* (2013.01); *G09G 3/001* (2013.01); *G09G 2320/0242* (2013.01); *G09G 2340/0407* (2013.01); *G09G 2340/0464* (2013.01); *G09G 2354/00* (2013.01)

(56) References Cited

U.S. PATENT DOCUMENTS

| | | | |
|---|---|---|---|
| 2006/0072215 A1* | 4/2006 | Nishi | G02B 13/06 359/708 |
| 2006/0077558 A1* | 4/2006 | Urakawa | A61B 3/0008 359/630 |
| 2008/0055193 A1* | 3/2008 | Tsuyuki | G02B 17/026 345/7 |
| 2010/0091027 A1* | 4/2010 | Oyama | G02B 27/0068 345/581 |
| 2011/0234475 A1 | 9/2011 | Endo | |
| 2012/0162764 A1 | 6/2012 | Shimizu | |

FOREIGN PATENT DOCUMENTS

| | | |
|---|---|---|
| JP | 2007-235335 A | 9/2007 |
| JP | 2008058703 A | 3/2008 |
| JP | 2009156992 A | 7/2009 |
| JP | 2010287835 A | 12/2010 |
| JP | 4609256 B2 | 1/2011 |
| JP | 2011203446 A | 10/2011 |
| JP | 2012-138654 A | 7/2012 |
| JP | 2012138654 A | 7/2012 |

OTHER PUBLICATIONS

International Search Report for Application No. PCT/JP2012/083736 dated Feb. 5, 2013.

Non Final Rejection for U.S. Appl. No. 14/117,692, dated May 7, 2015, 10 pages.

Non Final Rejection for U.S. Appl. No. 14/117,692, dated Dec. 15, 2015, 15 pages.

Final Rejection for U.S. Appl. No. 14/117,692, dated Jun. 23, 2016, 11 pages.

Advisory Action (PTOL-303) for U.S. Appl. No. 14/117,692, dated Aug. 31, 2016, 2 pages.

Non-Final Rejection for U.S. Appl. No. 14/117,692, dated Oct. 27, 2016, 11 pages.

Notice of Allowance and Fees Due (PTOL-85) for U.S. Appl. No. 14/117,692, dated Apr. 24, 2017, 8 pages.

* cited by examiner

DISPLAY IMAGE ACTUALLY SEEN AFTER CORRECTION

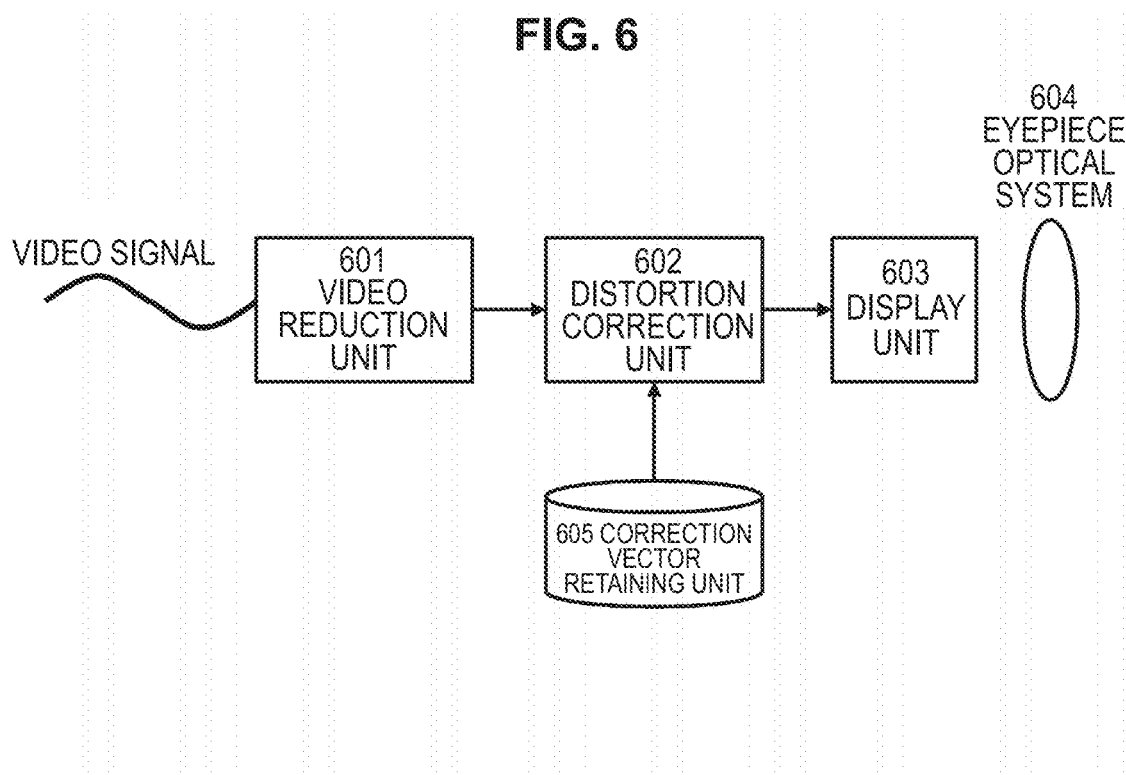

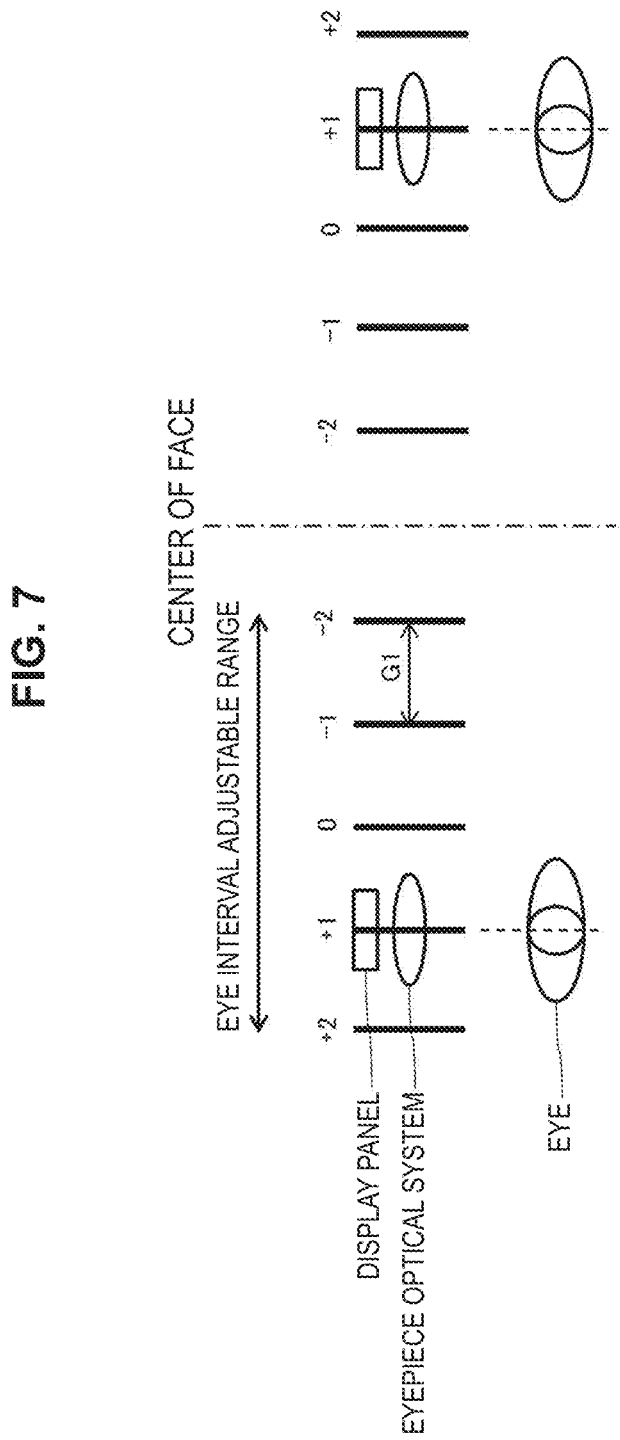

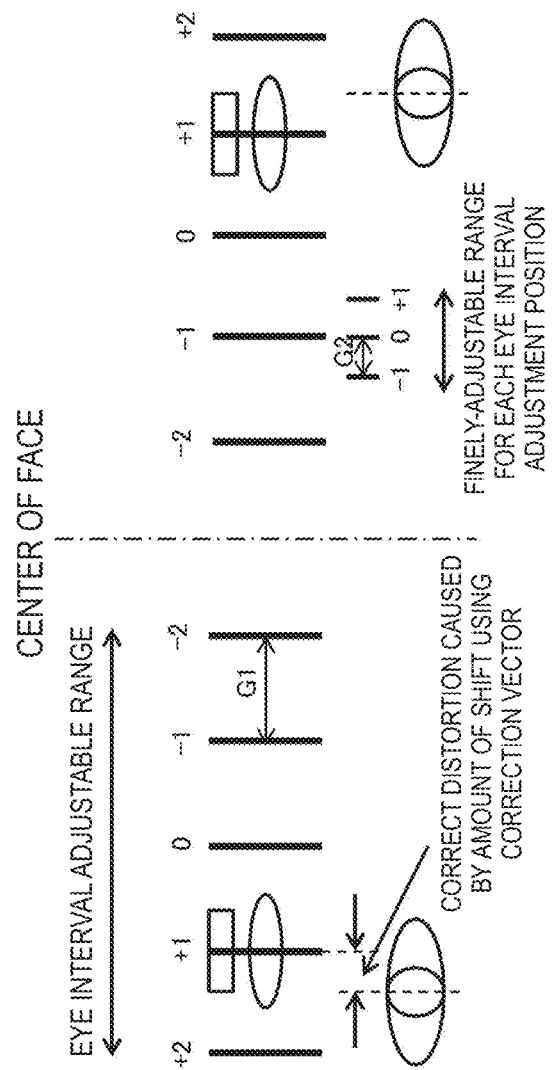

DISPLAY DEVICE, IMAGE PROCESSING DEVICE AND IMAGE PROCESSING METHOD

The present application is a continuation application of U.S. patent application Ser. No. 14/117,692 filed Nov. 14, 2013, which is a national stage entry of PCT application PCT/JP2012/083736 filed Dec. 26, 2012 and which claims the benefit of Japanese Priority Patent Application 2012-064899 filed Mar. 22, 2012, the entire contents of which are incorporated herein by reference.

TECHNICAL FIELD

The technology disclosed in the present specification relates to a display device, for example, a head-mount display in which display panels and lenses are combined, an image processing device and an image processing method, and a computer program, and particularly to a display device, an image processing device and an image processing method, and a computer program which correct distortion of images caused by a state of a user or differences between individual users.

BACKGROUND ART

A display device which is worn on a head for viewing images, in other words, a head-mount display (HMD), has been widely known. Such a head-mount display is configured to have optical units each for the left and right eyes, and to be able to control the senses of viewing and hearing by also using a headphone. If such a device is configured to completely block the outside world when mounted on a head, a feeling of virtual reality during viewing increases. In addition, as a head-mount display can also project different images to the right and left eyes, 3D images can be presented when images having parallax are displayed for the right and left eyes.

For a display unit of a head-mount display for the right and left eyes, high-definition display panels which include, for example, liquid crystal or organic EL (Electro-Luminescence) elements, or the like can be used. In addition, if a wide angle of view is set by enlarging and projecting image display elements with an eyepiece optical system, and multi-channels are realized using a headphone, a rich feeling of presence in a movie theater for viewing and listening can be reproduced.

Since there are differences among individual users in heights and intervals of eyes and a head-mount display has independent eyepiece optical systems for the right and left sides, it is necessary to match the positions of the eyepiece optical systems with those of the eyes of a user wearing the device. Since large screens are projected in front of the eyes, when reproduced video images of a Blu-ray disc, or the like are watched for a long period of time, it is preferable to precisely match the position of the images projected from a head-mount display with the eye interval to keep the eyes healthy.

For example, a head-mount display which has an eye interval adjusting mechanism using a rack-and-pinion method in response to differences between individual users has been proposed (for example, refer to Patent Literature 1). In addition, a head-mount display which has a rotary shaft between a left-eye display unit and a right-eye display unit is provided with a rotary member that is connected to each of the display units via arms, and includes an eye interval adjusting mechanism that adjusts the distance between the left-eye display unit and the right-eye display unit so as to be symmetric on the right and left sides by rotating the rotary member has been proposed (for example, refer to Patent Literature 2).

In addition, the specification of Japanese Patent Application No. 2010-287835 (Patent Literature 3), which has already been transferred to the present applicant, proposes a head-mount display which can precisely adjust an eye interval with a direct operation of an eye interval adjusting mechanism by a user wearing the device. Since this head-mount display displays a signal pattern for eye interval adjustment while the eye interval is adjusted, the user can more precisely adjust the eye interval by operating the eye interval adjusting mechanism by himself or herself while observing the signal pattern.

When the lens centers of eyepiece optical systems do not match the center positions of the eyes, the mismatch causes a part or all of a displayed image to appear distorted, or each of R, G, and B to appear shifted in a part or all of a screen due to magnification chromatic aberrations of lenses.

However, even when an eye interval adjusting mechanism is provided, it is difficult to precisely match the lens centers of the eyepiece optical systems and the center positions of the eyes. In addition, when it is not possible in the eye interval adjusting mechanism to adjust the positions with no stages, but only to fix the positions in stages, there are users for whom the eye interval is not able to be adjusted at all.

The problem of adjusting an eye interval as described above can be solved by using a lens which causes little distortion and magnification chromatic aberrations even if the lens centers do not match the center positions of the eyes. However, such a lens incurs a high manufacturing cost. In addition, since the weight of the lens becomes heavy, a feeling of wearing the head-mount display becomes worse.

Alternatively, such a problem of adjusting an eye interval can be solved by employing an eye interval adjusting mechanism which can adjust positions with no stages, but the employment causes the mechanism to be complicated, resulting in an increase in the device cost.

CITATION LIST

Patent Literature

Patent Literature 1: JP H6-276459A
Patent Literature 2: Japanese Patent No. 4609256
Patent Literature 3: JP 2012-138654A

SUMMARY OF INVENTION

Technical Problem

It is desirable to provide an excellent display device, an image processing device and an image processing method, and a computer program which can appropriately correct distortion of images caused by a state of a user or differences between individual users.

It is further desirable to provide an excellent display device, image processing device and image processing method, and computer program which can appropriately correct distortion of images which is caused by mismatch of the centers of lenses projecting displayed images and the center positions of the eyes of a user observing the projected images when the images are displayed using a combination of display panels and the lenses.

Solution to Problem

The present technology is provided to solve the above-mentioned issues. According to the technology described in claim 1 of the present application, there is provided a display device including a display unit that displays an image thereon, an eyepiece optical unit that projects a display image of the display unit on the eyes of a user, a correction information retaining unit that retains correction information created in advance according to a state of the user, and a distortion correction unit that corrects distortion of the display image based on correction information according to a current state of the user.

According to the technology described in claim 2 of the present application, the correction information retaining unit described in claim 1 may retain, as the correction information, a correction vector for correcting distortion of the display image caused by an amount of shift between the lens center of the eyepiece optical unit and the center positions of the eyes of a user. The distortion correction unit may correct the display image based on the correction vector according to the amount of shift between the lens center of the eyepiece optical unit and the center positions of the eyes of the user.

According to the technology described in claim 3 of the present application, the display device described in claim 1 may further include an eye interval adjusting mechanism that adjusts a position of the display unit with respect to the eye interval of a user in stages. The correction information retaining unit may retain, as the correction information, a correction vector for correcting distortion of the display image caused by an amount of shift of an interpolation position that is obtained by interpolating the interval of the stepwise adjustment position by the eye interval adjusting mechanism. The distortion correction unit may correct the display image based on a correction vector according to an amount of shift of the interpolation position remaining after the eye interval adjusting mechanism performs the adjustment.

According to the technology described in claim 4 of the present application, the correction information retaining unit described in claim 1 may retain, as the correction information, a correction vector for correcting distortion of the display image caused by an aberration unique to glasses. The distortion correction unit may correct the display image based on a correction vector corresponding to the glasses that a user wears.

According to the technology described in claim 5 of the present application, the correction information retaining unit described in claim 1 may retain, as the correction information, a correction vector for correcting distortion of the display image caused by the difference between an appropriate distance in terms of lens design for the distance direction between a lens of the eyepiece optical unit and the eyes of a user and the distance of the individual user. The distortion correction unit may correct the display image based on the correction vector.

Further, according to the invention described in claim 6 of the present application, there is provided an image processing device including a correction information retaining unit that retains correction information created in advance according to a state of a user, and a distortion correction unit that corrects distortion of a display image based on correction information according to a current state of the user.

Further, according to the invention described in claim 7 of the present application, there is provided an image processing method including retaining correction information that is created in advance according to a state of a user, and correcting distortion of a display image based on correction information according to a current state of the user.

Further, according to the invention described in claim 8 of the present application, there is provided a computer program that is described in a computer-readable form so as to cause a computer to function as a correction information retaining unit that retains correction information created in advance according to a state of a user, and a distortion correction unit that corrects distortion of a display image based on correction information according to a current state of the user.

The computer program according to claim 8 of the present application is defined as a computer program described in a computer-readable form so as to realize a predetermined process on a computer. In other words, by installing the computer program according to claim 8 of the present application in a computer, a cooperative action is exhibited on the computer, and thereby the same advantageous effect as that of the image processing device according to claim 5 of the present application can be obtained.

Advantageous Effects of Invention

According to the technology disclosed in the present specification, an excellent display device, image processing device and image processing method, and a computer program which can appropriately correct distortion of an image caused by differences between individual users or states of the users when the image is displayed using a combination of display panels and lenses can be provided.

In addition, according to the technology disclosed in the present specification, an excellent display device, image processing device and image processing method, and a computer program which can appropriately correct distortion of an image caused by mismatch of the centers of lenses projecting a display image and the center positions of the eyes of a user who observes the projected image when the image is displayed using a combination of display panels and lenses can be provided.

According to the technology disclosed in the present specification, a distortion correction vector according to an amount of shift between the lens center of the eyepiece optical system and the center position of an eye can be created in advance, and an image can be corrected using a correction vector according to an amount of actual shift when a user wears the display device.

According to the technology disclosed in the present specification, by allowing a certain degree of distortion and a magnification chromatic aberration occurring in an observed image and supplementing the allowed portion with image correction, a manufacturing cost of a lens can be lowered, or the weight of a lens can be reduced.

In addition, according to the technology disclosed in the present specification, by supplementing fine adjustment of an eye interval with image correction, a configuration of the eye interval adjusting mechanism can be simplified, and a cost can be reduced.

In addition, according to the technology disclosed in the present specification, with regard to the distance direction between a lens of the eyepiece optical unit and the eyes of a user, an aberration caused by a difference between an appropriate distance in terms of lens design and the distance of an individual user that varies depending on users can be compensated through image correction.

The technology disclosed in the present specification can respond to various aberrations caused by a state of a user or differences between individual users by changing the correction vectors. For example, when a person who wears glasses uses a head-mount display, there are cases in which the user sees an aberration unique to the glasses and thus fails to observe a correct image. In such a case, by measuring the aberration of the glasses in advance and superimposing the aberration on the distortion correction vector, a correct image obtained by correcting the aberration can be presented even when wearing the glasses.

Other objects, features, and advantages of the present invention will be further apparent with detailed description based on later-mentioned embodiments of the present invention and attached drawings.

BRIEF DESCRIPTION OF DRAWINGS

FIG. 6 is an illustration schematically showing a configuration of a processing system for a video signal in a head-mount display.

FIG. 7 is an illustration for describing a structure of eye interval adjustment performed by an eye interval adjusting mechanism.

FIG. 8 is an illustration for describing a structure of interpolating a gap between eye interval adjustment positions performed by the eye interval adjusting mechanism.

DESCRIPTION OF EMBODIMENT

Hereinafter, a preferred embodiment of the present invention will be described in detail with reference to the appended drawings. Note that, in this specification and the drawings, elements that have substantially the same function and structure are denoted with the same reference signs, and repeated explanation is omitted.

Figure 1:
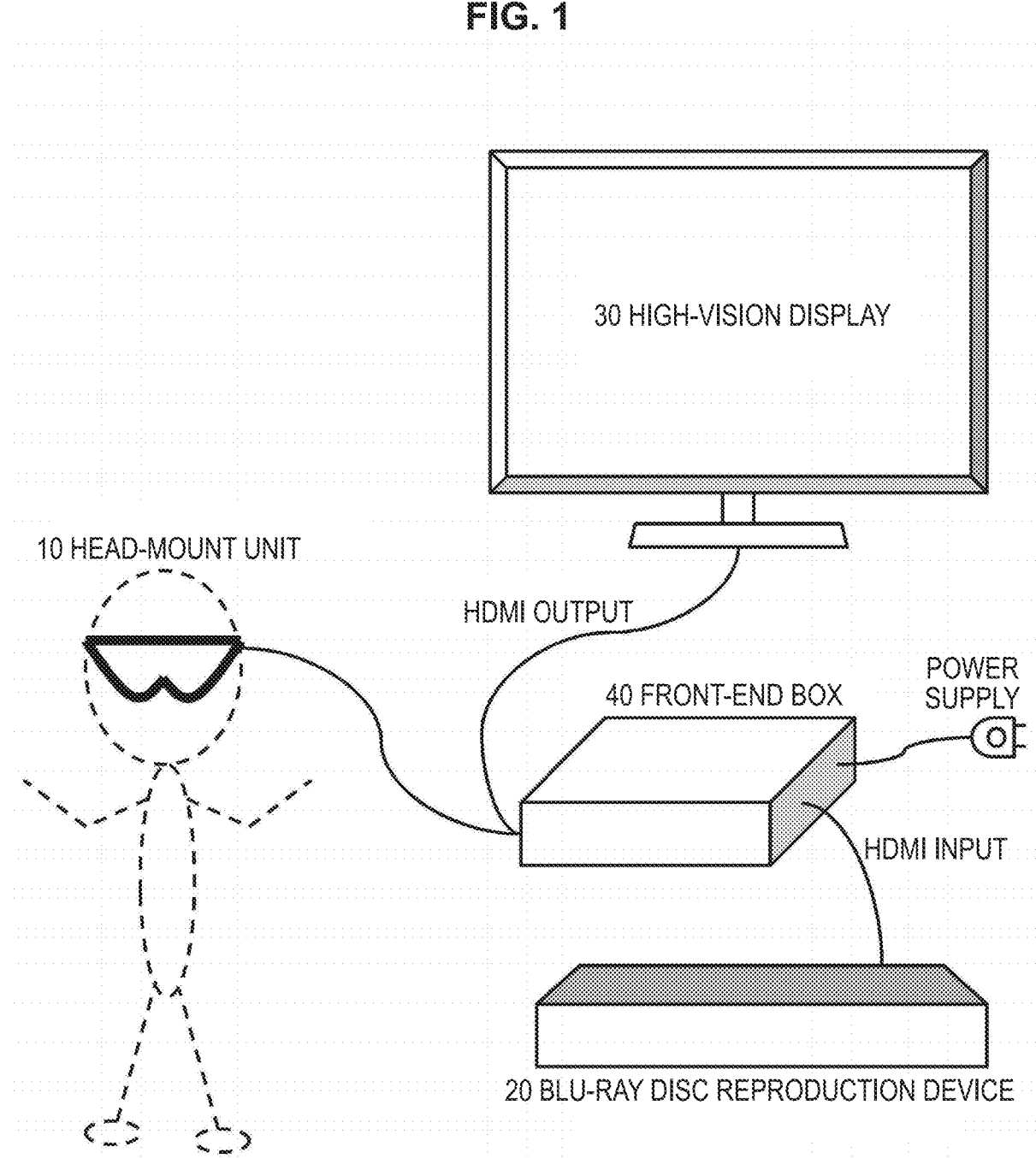
FIG. 1 is an illustration schematically showing a configuration of an image display system including a head-mount display.

FIG. 1 schematically shows a configuration of an image display system including a head-mount display. The system shown in the drawing is constituted by a Blu-ray disc reproduction device 20 that serves as a source of viewing content, a front-end box 40 that processes AV signals output from the Blu-ray disc reproduction device 20, a head-mounting type display device (head-mount unit) 10 that is an output destination of reproduced content of the Blu-ray disc reproduction device 20, and a high-vision display (for example, an HDMI-compatible television) 30 that is another output destination of the Blu-ray disc reproduction device 20. One head-mount display is configured by the head-mount unit 10 and the front-end box 40.

The front-end box 40 corresponds to an HDMI repeater that, for example, processes AV signals output from the Blu-ray disc reproduction device 20 and outputs the signals to an HDMI port when an HDMI input of the AV signals is received. In addition, the front-end box 40 is a 2-output switcher that switches the output destination of the Blu-ray disc reproduction device 20 to any one of the head-mount unit 10 or the high-vision display 30. The front-end box 40 has two outputs in the example of the drawing, but may have three or more outputs. However, the front-end box 40 has an exclusive output destination of AV signals, and puts priority on output to the head-mount unit 10.

Note that HDMI (High-Definition Multimedia Interface) is an interface standard for digital home appliances mainly for transmitting sounds and videos based on DVI (Digital Visual Interface) using TMDS (Transition Minimized Differential Signaling) in a physical layer. The present system is based on, for example, an HDMI 1.4 specification.

The Blu-ray disc reproduction device 20 and the front-end box 40, and the front-end box 40 and the high-vision display 30 are respectively connected to each other with HDMI cables. The front-end box 40 and the head-mount unit 10 can also be configured to be connected with an HDMI cable, but AV signals may be serially transmitted therebetween using a cable of other specifications. However, AV signals and power may be set to be supplied to one cable connecting the front-end box 40 and the head-mount unit 10, and the head-mount unit 10 can obtain drive power via the cable.

The head-mount unit 10 has independent display units for the left eye and the right eye. Each of the display units uses a display panel including, for example, organic EL elements. In addition, each of the left and right display units is equipped with a high-definition eyepiece optical system which causes low distortion and has a wide viewing angle. If a wide angle of view is set by enlarging and projecting image display elements with the eyepiece optical system, and multi-channels are realized using a headphone, a rich feeling of presence in a movie theater for viewing and listening can be reproduced.

Figure 2:
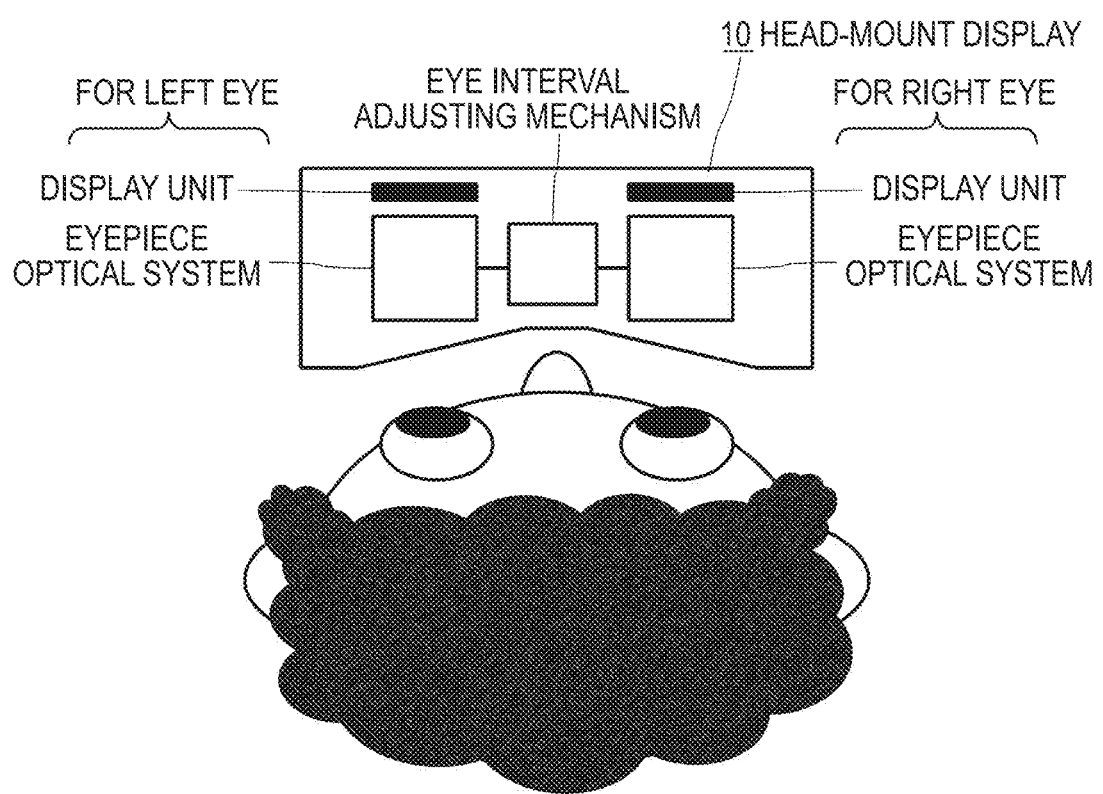
FIG. 2 is an illustration showing a state in which a top side of the main body of a head-mount unit 10 equipped with an eye interval adjusting mechanism is overlooked.

Since there are differences between individual users in heights and intervals of eyes, and the head-mount unit 10 has the independent optical systems for the right and left sides, it is necessary to match positions of the optical systems with those of the eyes of a user wearing the unit. For this reason, in the present embodiment, the main body part of the head-mount unit 10 is equipped with an eye interval adjusting mechanism which adjusts eye intervals between the right-eye display unit and the left-eye display unit. To speak in terms of the relationship between the right and left eyes and the display units, the eye interval adjusting mechanism adjusts the positions of the display units for the eye interval of a user. FIG. 2 shows a state in which a top side of the main body part of the head-mount unit 10 equipped with the eye interval adjusting mechanism is overlooked.

A component of a mechanism may be used for mounting the eye interval adjusting mechanism. However, a mechanism that is used for binoculars and microscopes for adjusting eye intervals with one eye interval adjustment axis arranged between right and left barrels is not preferable due to the fact that the height from a nose pad part (in other words, the position of the user's nose) to the display units changes according to the rotation of the eye interval adjustment axis. On the other hand, the configuration of the eye interval adjustment mechanism using, for example, the rack-and-pinion method is favorable since the height from the nose pad part to the display units can be constantly maintained during adjustment of eye intervals. However, the gist of the technology disclosed in the present specification is not limited only to the rack-and-pinion method, and an eye interval adjusting mechanism using another method is possible as long as there is no inconvenience in changing the height of the display units when an eye interval is adjusted.

Here, in a display device such as a head-mount display in which display panels and lenses are combined, there is a problem of distortion occurring when a display image is observed through lenses due to lens distortion and a magnification chromatic aberration. In the field of the corresponding technology, a method of correcting distortion through signal processing is known. In other words, by imparting distortion to a display image in the opposite direction of a distortion characteristic of an eyepiece optical system, a normal image that does not include distortion can be observed when viewed through the eyepiece optical system. Distortion in the opposite direction imparted to each pixel of an input image is hereinafter called a "correction vector." A correction vector has a pixel position on an input image as a beginning point and has a pixel position corresponding to the beginning point on a display image as an end point.

In addition, when the lens centers of eyepiece optical systems do not match the center positions of the eyes, the mismatch causes a part or all of a display image to appear distorted, or each of R, G, and B to appear shifted in a part or all of a screen due to a magnification chromatic aberration of lenses.

Figure 3:
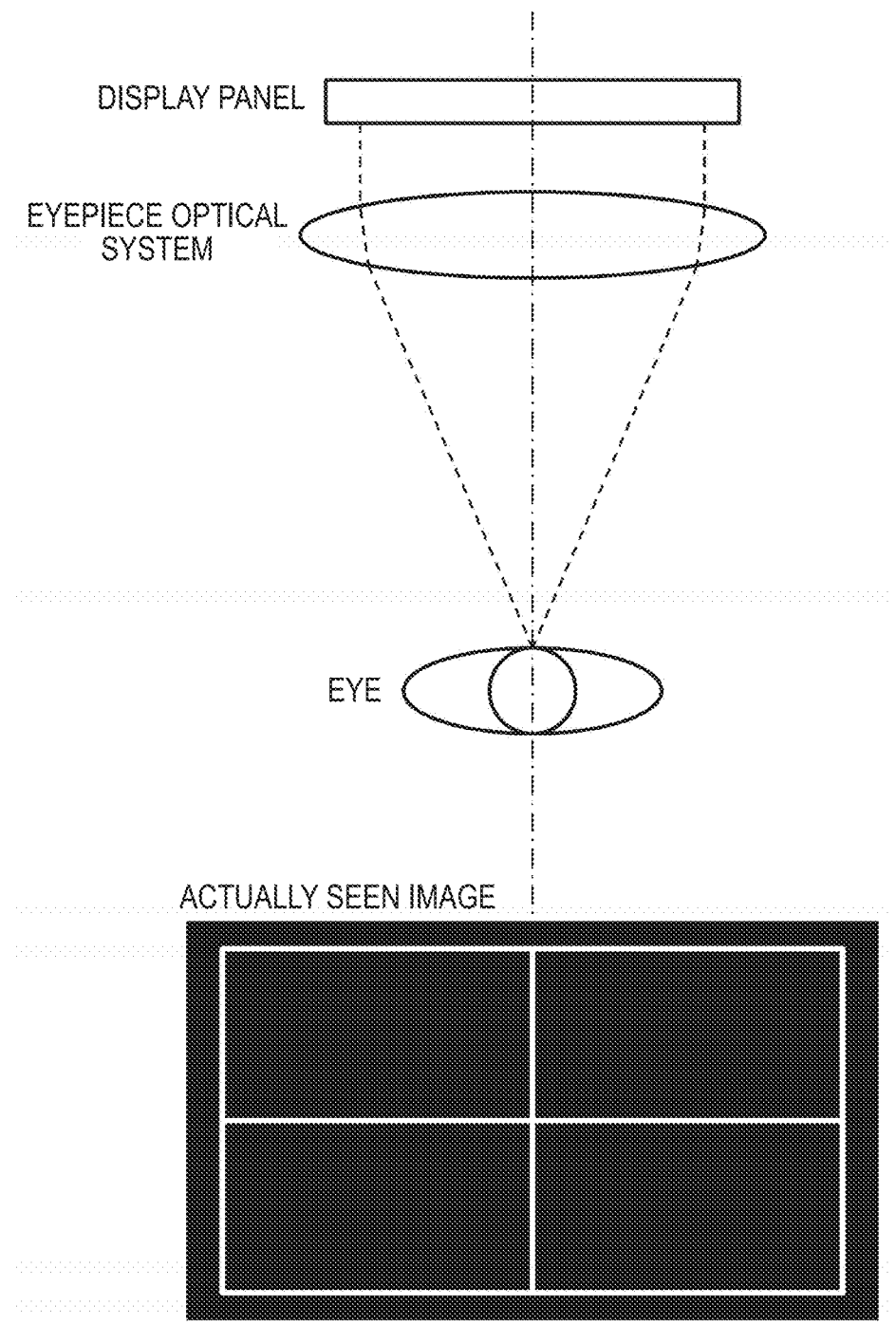
FIG. 3 is an illustration exemplifying an image observed when the lens center of an eyepiece optical system matches the center position of an eye.

FIG. 3 exemplifies an image observed when the lens center of an eyepiece optical system matches the center position of an eye. Conversely, FIG. 4 exemplifies an image observed when the lens center of the eyepiece optical system does not match the center position of the eye. In the former example, a white-lined lattice image displayed on a display panel is correctly observed through a lens. However, in the latter example, the center position of the eye is shifted from the lens center to the left side, a magnification chromatic aberration occurs on the right edge of a screen, and from a green signal, red is shifted on the right side, and conversely, blue is shifted to the left side.

Sometimes it is difficult for a user to precisely match the lens centers of eyepiece optical systems with the center positions of the eyes. In addition, when an eye interval adjusting mechanism is not able to adjust a position with no stages, but only to fix a position in stages, some users may not be able to precisely adjust an eye interval at all. An eye interval adjusting mechanism that can adjust a position with no stages has a complicated structure, which results in an increasing device cost. When lenses that do not cause distortion or magnification chromatic aberrations are used, although the centers of the lenses may be allowed not to match the center positions of the eyes, the device cost increases, and a feeling of wearing the device deteriorates due to a weight increase of the lenses.

Thus, in the present embodiment, a distortion correction vector according to an amount of shift between the lens centers of the eyepiece optical systems and the center positions of the eyes is set to be created in advance. Then, by correcting an input image using the correction vector according to the amount of shift between the lens centers of the eyepiece optical systems and the center positions of the eyes when a user wears the head-mount unit 10, an image that does not have distortion or color shifts is presented.

Figure 4:
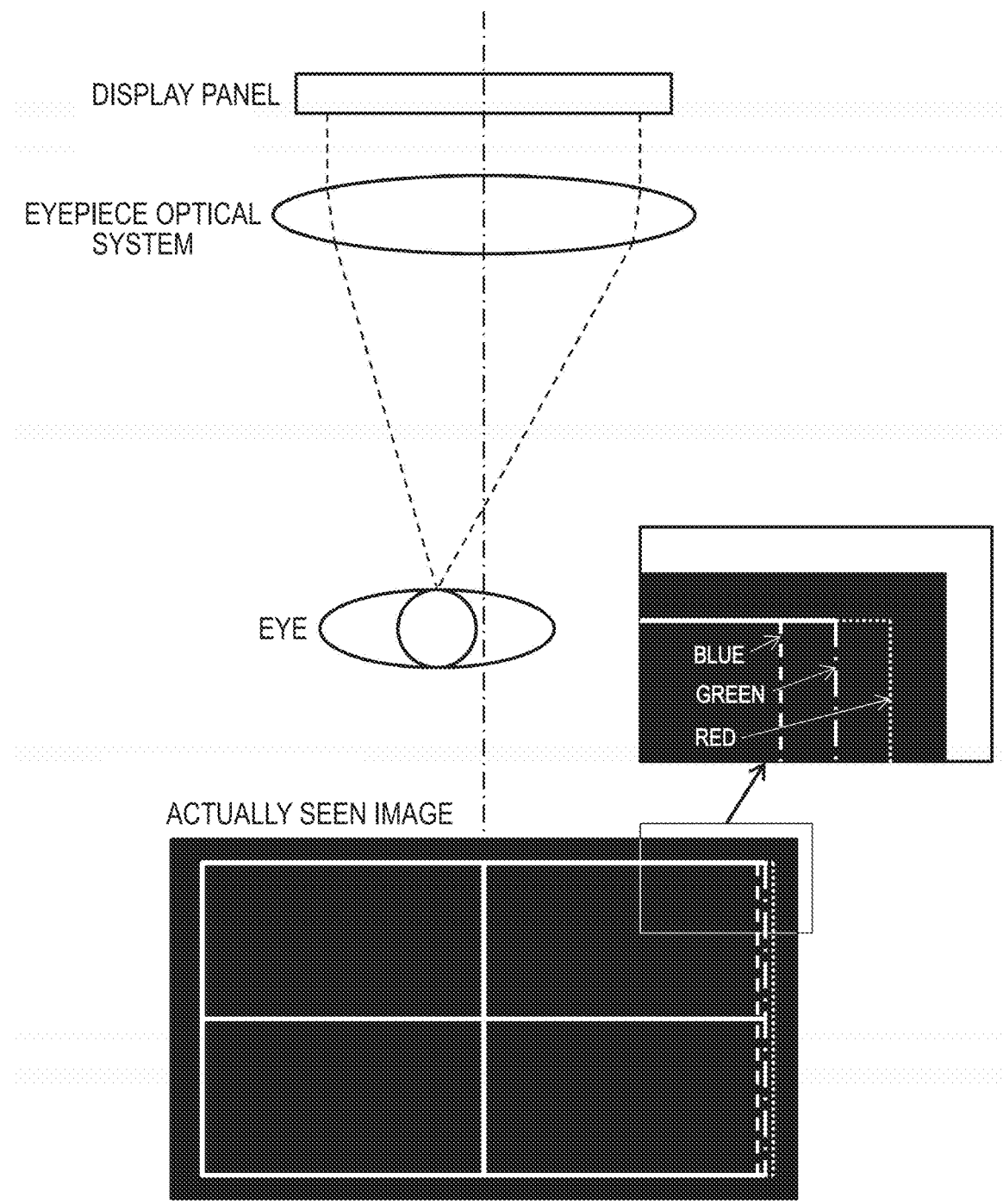
FIG. 4 is an illustration exemplifying an image observed when the lens center of the eyepiece optical system does not match the center position of the eye.
Figure 5A:
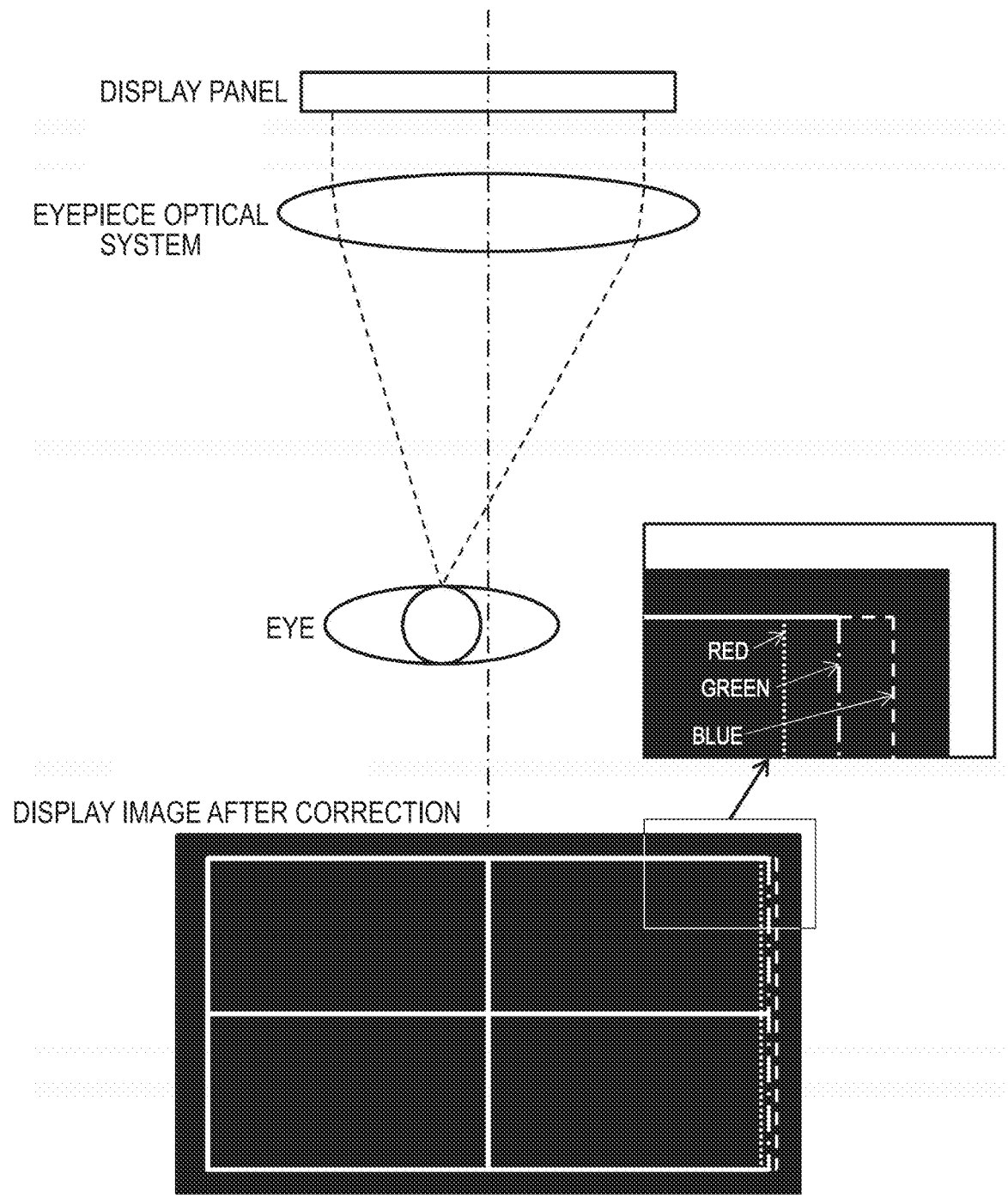
FIG. 5A is an illustration showing a displayed image after an input image is corrected based on a correction vector when the lens center of the eyepiece optical system does not match the center position of the eye.
Figure 5B:
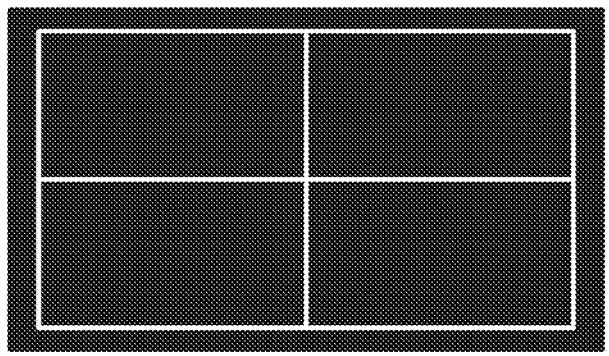
FIG. 5B is an illustration showing an image obtained by observing the displayed image after the correction shown in FIG. 5A through the lens.

FIG. 5A shows a display image after an input image is corrected based on a correction vector when the lens center of the eyepiece optical system does not match the center position of the eye. In addition, FIG. 5B shows an image obtained by observing the displayed image through the lens. As described with reference to FIG. 4, due to the mismatch of the lens center and the center position of the eye, a magnification chromatic aberration in which red is shifted to the right side, and blue is shifted to the left side from a green signal occurs, and thus, the correction vector causes red to be shifted to the left side and blue to be conversely shifted to the right side from the green signal as shown in FIG. 5A. Then, when the corrected image is observed through the lens, a correct white-lined lattice can be seen as shown in FIG. 5B.

FIG. 6 schematically shows a configuration of a processing system for a video signal in a head-mount display. Even though the drawing illustrates the system only for one side of the left eye or the right eye, configurations for the eyes are the same.

A display unit 603 has a high-definition display panel including, for example, liquid crystal, organic EL (Electro-Luminescence) elements, or the like. In addition, an eyepiece optical system 604 enlarges and projects display videos of the display unit 603. A lens constituting the eyepiece optical system 604 is designed based on, for example, a result of optical simulation.

A video reduction unit 601 processes input video signals to be reduced so that the signals are appropriate for the size of a display panel. A distortion correction unit 602 corrects input images from the video reduction unit 601 based on a correction vector according to mismatch of the lens center of the eyepiece optical system 604 with the center position of an eye.

A correction vector retaining unit 605 stores correction vectors created in advance. The correction vector retaining unit 605 stores one or more correction vectors created in advance such as a correction vector for correcting lens distortion or a magnification chromatic aberration of the eyepiece optical system 604, and a correction vector for correcting a magnification chromatic aberration based on the mismatch of the lens center of the eyepiece optical system 604 with the center position of the eye. The distortion correction unit 602 can also correct an input image by superimposing two or more correction vectors stored in the correction vector retaining unit 605 if necessary.

FIG. 7 illustrates a structure of eye interval adjustment performed by an eye interval adjusting mechanism. The eye interval adjusting mechanism is set to be able to adjust a position in stages with a predetermined interval G1 as a unit of scale in the range of ±2 from the initial position 0. In the example of the drawing, at the positions of the scale +1, the lens centers match the center positions of the eyes.

However, when the eye interval adjusting mechanism is not able to adjust positions with no stages, the lens centers do not necessarily match the center positions of the eyes at any positions of scales. In the example shown in FIG. 8, by adjusting the positions of +1 within the scale G1, the lens centers are brought nearest to the center positions of the eyes, but do not completely match them. In other words, even when an eye interval is adjusted using the eye interval adjusting mechanism, there is a possibility of a shift less than a gap of stepwise adjustment positions remaining. If such mismatch is neglected, a magnification chromatic aberration occurs in an observed image as shown in FIG. 4.

Thus, correction vectors for correcting magnification chromatic aberration caused by mismatch of an interval G2 that is smaller than the unit of a scale G1 (G2<G1) of position adjustment by the eye interval adjusting mechanism are generated in advance and stored in the correction vector retaining unit 605. After the eye interval is adjusted using the eye interval adjustment mechanism as much as possible and the distortion correction unit 602 corrects an image according to the correction vectors, distortion can be corrected so that the minimum interval G1 of position adjustment performed by the eye interval adjusting mechanism is interpolated.

In the example shown in FIG. 8, correction vectors in interpolation positions of ±1 in the unit of the interval G2 are prepared in advance for each of the scales of position adjustment. Then, the lens centers are brought nearest to the center positions of the eyes when the eye interval adjusting mechanism adjusts the lens centers to be in the position of the scale +1, however, when the mechanism is shifted from the scale G2 of the interpolation position by −1, the correction vector for "−1" is applied to perform fine adjustment in the interval G2, and thereby magnification chromatic aberration can be suppressed.

Figure 9:
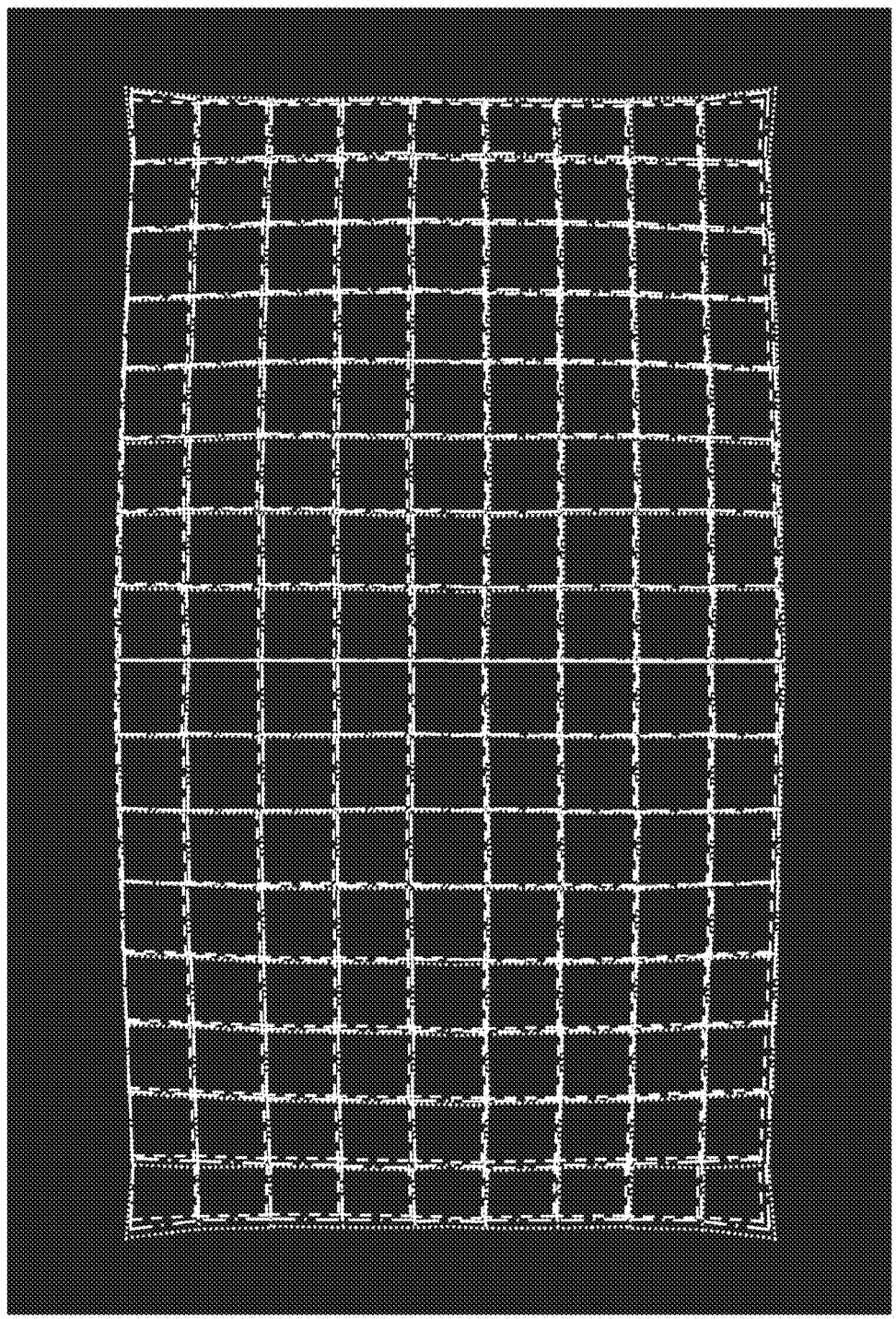
FIG. 9 is an illustration showing a corrected image when the lens center of an eyepiece optical system 604 matches the center position of an eye.

FIG. 9 shows a corrected image when the lens center of the eyepiece optical system 604 matches the center position of an eye (in the drawing, narrow dotted lines correspond to red, wide dotted lines correspond to blue, and dashed lines correspond to green). Meanwhile, an original image before correction is set to be the white-lined lattice image. Since distortion and magnification chromatic aberration are corrected separately for each of R, G, and B, the positions of R, G, and B are slightly shifted in a corrected image. In addition, since the amount of distortion increases toward the periphery of the image, the amount of shift of each color component increases. As the image is viewed through the eyepiece optical system 604, a correct white-lined lattice image can be seen.

Figure 10:
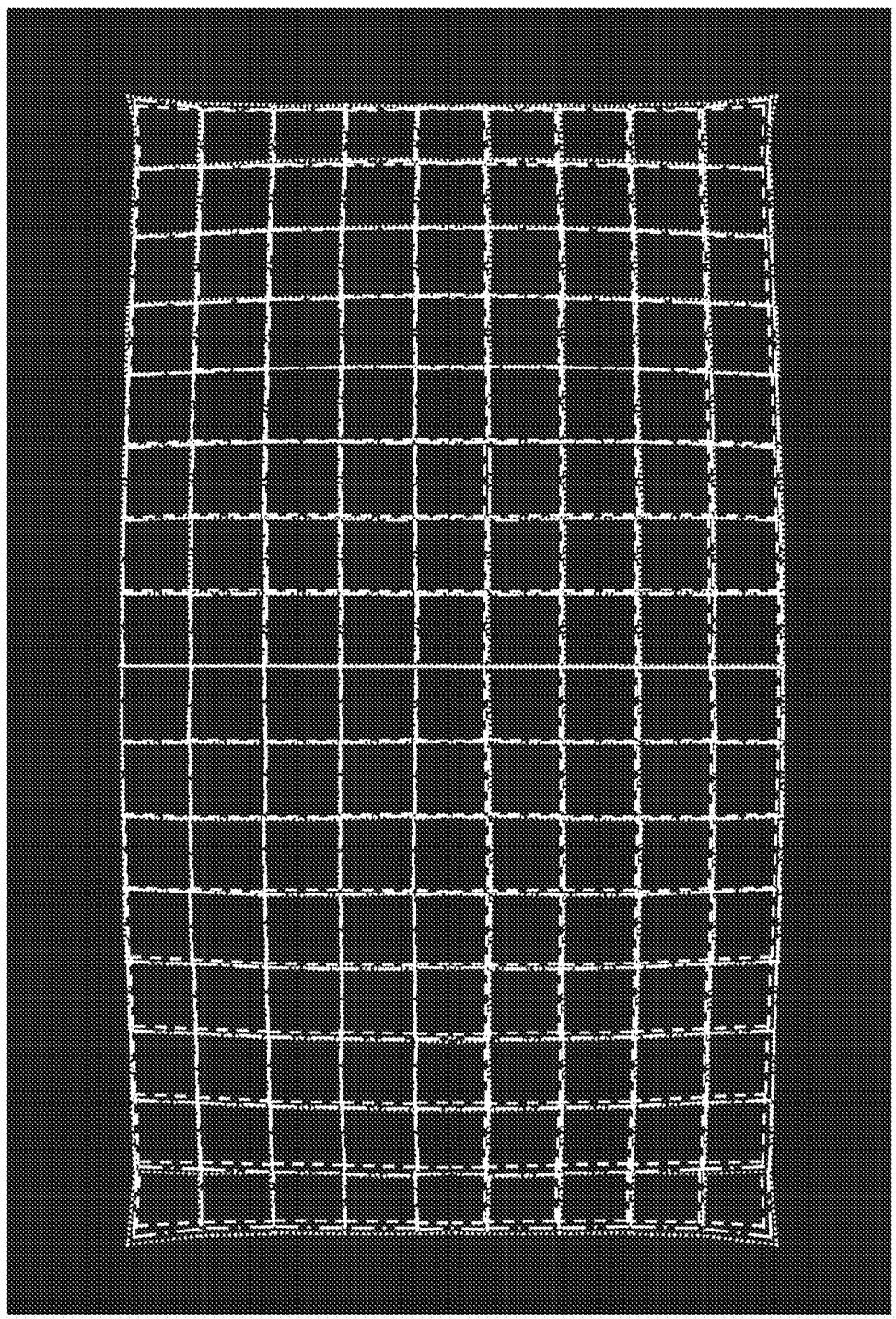
FIG. 10 is an illustration showing a corrected image when the center position of an eye is shifted to the left side of the lens center of the eyepiece optical system 604 by 4 mm.

In addition, FIG. 10 shows a corrected image when the center position of an eye is shifted to the left side of the lens center of the eyepiece optical system 604 by 4 mm (in the drawing, narrow dotted lines correspond to red, wide dotted lines correspond to blue, and dashed lines correspond to green). Meanwhile, an original image before correction is set to be the white-lined lattice image. In this case, in addition to correction of distortion and magnification chromatic aberration performed separately for each of R, G, and B, a shift of the center position of the eye is corrected. A corrected image in which the positions of R, G, and B are slightly shifted is obtained, but the positions of R, G, and B on the right edge of the corrected image are shifted, and thus the corrected image becomes different from the image before the correction. In the example shown in the drawing, since the shifts of red and blue from green are made in a decreasing direction, the amounts of shifts of R, G, and B on the right edge of the corrected image are smaller than the example shown in FIG. 9.

An example of the procedure for performing the interpolation of the eye interval adjusting mechanism will be described with reference to FIGS. 11A to 11C. In a state in which white-lined lattice images are displayed on right and left display panels, for example, a user performs mechanical eye interval adjustment in the minimum interval G1 using the eye interval adjusting mechanism, and selects positions of the lens centers nearest to the centers of the eyes. Next, images obtained by correcting the white-lined lattice images using correction vectors of each of the positions −1, 0, and +1 in the scale G2 for interpolating the minimum interval G1 of position adjustment by the eye interval adjusting mechanism in the eye interval adjustment position are displayed in order. In the example shown in FIG. 11C, the lens positions match the center positions of the eyes best in the interpolation position +1 in the eye interval adjustment position, and thus a corrected image using the correction vectors for the interpolation position +1 becomes a correct white-lined lattice image in which chromatic aberration is rarely observed. On the other hand, as shown in FIGS. 11A and 11B, the centers of the eyes are shifted from the lens center to the left side in both interpolation positions −1 and 0, and thus a color shift becomes more conspicuous toward the right side of a screen.

Figure 11A:
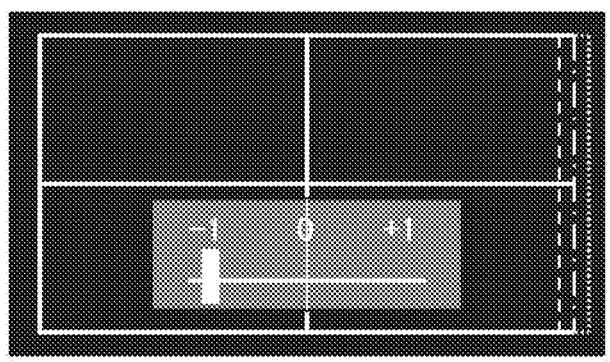
FIG. 11A is an illustration for describing a procedure of performing interpolation of the eye interval adjusting mechanism.
Figure 11B:
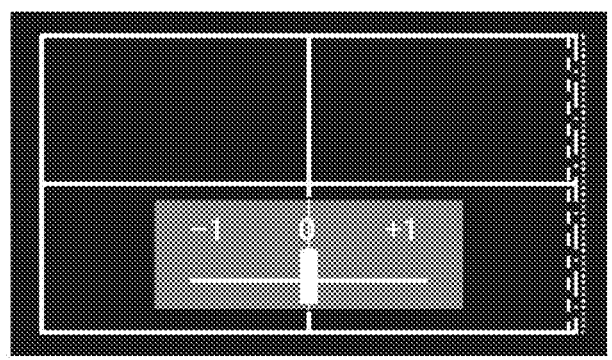
FIG. 11B is an illustration for describing another procedure of performing interpolation of the eye interval adjusting mechanism.
Figure 11C:
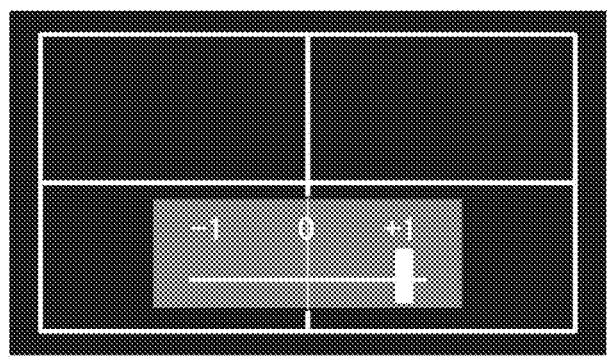
FIG. 11C is an illustration for describing still another procedure of performing interpolation of the eye interval adjusting mechanism.

For example, information indicating the interpolation positions is displayed in an OSD manner together with the corrected image based on the correction vectors in each of the interpolation positions, and a user may be allowed to select a correction vector of an interpolation position to be used in correction among the vectors shown in FIGS. 11A to 11C. Alternatively, adjustment may be automatically performed by reading the eye interval and the center positions of the eyes of a user using a camera, or the like.

As described above, it is not necessary to use an eye interval adjusting mechanism that can perform adjustment with no stages, and a device cost can be cut. In addition, merely by changing a correction vector to be applied to an input image, interpolation of the eye interval adjusting mechanism can be realized without making other changes in the design at all. In addition, by allowing a certain degree of distortion and a magnification chromatic aberration occurring in an observed image and supplementing the allowed portion with image correction, a manufacturing cost of a lens can be lowered, and the weight of the lens can be reduced.

In addition, by changing the correction vectors stored in the correction vector retaining unit 605, the distortion correction unit 202 can respond to various aberrations caused by differences between individual users.

As another example of aberration caused by differences between individual users, when a person wearing glasses uses a head-mount display, an aberration unique to the glasses occurs, and thus the user may not be able to observe a correct image. In such a case, the aberration of the glasses is measured in advance, and correction vectors for correcting the aberration of the glasses are stored in the correction vector retaining unit 605. Then, when the person wearing the glasses wears the head-mount display, the distortion correction unit 602 can present a correct image of which the aberration has been corrected even when wearing the glasses by superimposing the correction vector for the glasses on the correction vector for correcting lens distortion and a magnification chromatic aberration or the correction vector for interpolating an eye interval position.

In addition, as another example resulting from differences between individual users, with regard to the Z direction, that is, the distance direction between the lens of the eyepiece optical system 604 and the eyes of a user, there are cases in which it is difficult to observe a correct image because an aberration occurs due to a difference between an appropriate distance in terms of lens design and the distance of an individual user, which may differ depending on users. Also in such a case, an aberration caused by the difference between the appropriate distance in terms of lens design and the distance of an individual user is measured for the user in advance, and correction vectors are stored in the correction vector retaining unit 605. Then, when the user wears a head-mount unit, a correct image of which an aberration has been corrected can be presented to the user while wearing the glasses as the distortion correction unit 602 superimposes a correction vector for the difference between the appropriate distance and the distance of the individual user on a correction vector for correcting lens distortion and a magnification chromatic aberration, or a correction vector for interpolating an eye interval position.

Additionally, the present technology may also be configured as below.

(1)

A display device including:

a display unit that displays an image thereon;

an eyepiece optical unit that projects a display image of the display unit on the eyes of a user;

a correction information retaining unit that retains correction information created in advance according to a state of the user; and a distortion correction unit that corrects distortion of the display image based on correction information according to a current state of the user.

(2)

The display device according to (1), wherein the correction information retaining unit retains, as the correction information, a correction vector for correcting distortion of the display image caused by an amount of shift between the lens center of the eyepiece optical unit and the center positions of the eyes of a user, and wherein the distortion correction unit corrects the display image based on the correction vector according to the amount of shift between the lens center of the eyepiece optical unit and the center positions of the eyes of the user.

(3)

The display device according to (1), further including:

an eye interval adjusting mechanism that adjusts a position of the display unit with respect to the eye interval of a user in stages, wherein the correction information retaining unit retains, as the correction information, a correction vector for correcting distortion of the display image caused by an amount of shift of an interpolation position that is obtained by interpolating the interval of the stepwise adjustment position by the eye interval adjusting mechanism, and wherein the distortion correction unit corrects the display image based on a correction vector according to an amount of shift of the interpolation position remaining after the eye interval adjusting mechanism performs the adjustment.

(4)

The display device according to (1), wherein the correction information retaining unit retains, as the correction information, a correction vector for correcting distortion of the display image caused by an aberration unique to glasses, and wherein the distortion correction unit corrects the display image based on a correction vector corresponding to the glasses that a user wears.

(5)

The display device according to (1), wherein the correction information retaining unit retains, as the correction information, a correction vector for correcting distortion of the display image caused by the difference between an appropriate distance in terms of lens design for the distance direction between a lens of the eyepiece optical unit and the eyes of a user and the distance of the individual user, and wherein the distortion correction unit corrects the display image based on the correction vector.

(6)

An image processing device including:

a correction information retaining unit that retains correction information created in advance according to a state of a user; and a distortion correction unit that corrects distortion of a display image based on correction information according to a current state of the user.

(7)

An image processing method including:

retaining correction information that is created in advance according to a state of a user; and correcting distortion of a display image based on correction information according to a current state of the user.

(8)

A computer program that is described in a computer-readable form so as to cause a computer to function as:

a correction information retaining unit that retains correction information created in advance according to a state of a user; and a distortion correction unit that corrects distortion of a display image based on correction information according to a current state of the user.

Hereinabove, the technology disclosed in the present specification has been described in detail with reference to the specific embodiment. However, it is obvious that a person skilled in the art may find various alternations and modifications within the scope of the appended claims.

In the present specification, although the embodiment in which the technology disclosed in the present specification is applied to a head-mount display has been mainly described, the scope of the technology disclosed in the present specification is not limited to a configuration of a specific head-mount display. The technology disclosed in the present specification can be applied in the same manner to various types of display systems that include a combination of display panels and lenses in which images are presented to users.

In short, the technology disclosed in the present specification has been described in the form of exemplification, which does not limit the interpretation of the disclosed content of the present specification. When the gist of the technology disclosed in the present specification is determined, claims thereof should be considered.

REFERENCE SIGNS LIST

10 head-mount unit
20 Blu-ray disc reproduction device
30 high-vision display
40 front-end box
601 video reduction unit
602 distortion correction unit
603 display unit
604 eyepiece optical system
605 correction vector retaining unit

The invention claimed is:

1. A display device, comprising:

a display screen configured to display an image;

an eyepiece configured to project the image displayed on the display screen; and at least one processor configured to:

determine an amount of shift between each lens center of the eyepiece and a respective center position of center positions of a user's eyes, wherein the image is visible through the eyepiece;

adjust a position of the lens center of the eyepiece, with respect to the center positions of the user's eyes, based on the amount of shift;

interpolate a first interval, of the adjustment of the position of the lens center, based on the amount of shift, wherein the first interval is smaller than a unit of a scale of the adjustment of the position of the lens center;

superimpose a first correction vector of a plurality of correction vectors on a second correction vector of the plurality of correction vectors based on the adjustment of the position of the lens center; and correct distortion of the image based on
the superimposition of the first correction vector on the second correction vector, and
the interpolation of the first interval.

2. The display device according to claim 1, wherein one of the first correction vector or the second correction vector is based on an eye interval of the user's eyes.

3. The display device according to claim 1, wherein the at least one processor is further configured to generate the plurality of correction vectors, in advance, based on a user state.

4. The display device according to claim 3, wherein the distortion of the image is based on the amount of shift, and
one of the first correction vector or the second correction vector corresponds to the amount of shift.

5. The display device according to claim 3, wherein the distortion is based on a difference between a first distance associated with a lens design and a second distance associated with the user's eyes, and
each of the first distance and the second distance is associated with a distance direction between a lens of the eyepiece and the user's eyes.

6. The display device according to claim 1, further comprising
an eye interval adjusting mechanism configured to adjust, in stages, a position of the display screen with respect to an eye interval of the user's eyes, wherein
one of the first correction vector or the second correction vector corresponds to a shift amount of an interpolation position remaining after the adjustment of the position of the display screen.

7. The display device according to claim 1, wherein the at least one processor is further configured to generate, in advance, correction information corresponding to the amount of shift.

8. The display device according to claim 1, wherein the at least one processor is further configured to correct the distortion of the image based on a magnification chromatic aberration of the eyepiece.

9. A display device, comprising:
a display screen configured to display an image;
an eyepiece configured to project the image displayed on the display screen; and
at least one processor configured to:
determine an amount of shift between each lens center of the eyepiece and a respective center position of center positions of a user's eyes, wherein the image is visible through the eyepiece;
adjust a position of the lens center of the eyepiece, with respect to the center positions of the user's eyes, based on the amount of shift;
interpolate a first interval, of the adjustment of the position of the lens center, based on the amount of shift, wherein the first interval is smaller than a unit of a scale of the adjustment of the position of the lens center;
superimpose a first correction vector of a plurality of correction vectors on a second correction vector of the plurality of correction vectors based on the adjustment of the position of the lens center; and
correct distortion of the image based on
the superimposition of the first correction vector on the second correction vector, and
the interpolation of the first interval,
wherein one of the first correction vector or the second correction vector is associated with an aberration that corresponds to user's glasses.

10. An image processing device, comprising:
at least one processor configured to:
determine an amount of shift between each lens center of an eyepiece and a respective center position of center positions of a user's eyes, wherein a display image is visible through the eyepiece;
adjust a position of the lens center of the eyepiece, with respect to the center positions of the user's eyes, based on the amount of shift;
interpolate a first interval, of the adjustment of the position of the lens center, based on the amount of shift, wherein the first interval is smaller than a unit of a scale of the adjustment of the position of the lens center;
superimpose a first correction vector of a plurality of correction vectors on a second correction vector of the plurality of correction vectors based on the adjustment of the position of the lens center; and
correct distortion of the display image based on
the superimposition of the first correction vector on the second correction vector, and
the interpolation of the first interval,
wherein at least one of the first correction vector or the second correction vector is based on a user state and an aberration that corresponds to user's glasses.

11. The image processing device according to claim 10, wherein the at least one of the first correction vector or the second correction vector based on the user state, corresponds to an eye interval of the user's eyes.

* * * * *